WEBB & CORY.

Evaporating Pan.

No. 63,678.

Patented April 9, 1867.

Inventors:
James A. Webb
Christopher Cory

United States Patent Office.

JAMES A. WEBB, OF MADISON, NEW JERSEY, AND CHRISTOPHER CORY, OF LIMA, INDIANA, ASSIGNORS TO CHRISTOPHER CORY.

*Letters Patent No. 63,678, dated April 9, 1867.*

---

IMPROVEMENT IN EVAPORATING-PANS.

---

The Schedule referred to in these Letters Patent and making part of the same.

---

TO ALL WHOM IT MAY CONCERN:

Be it known that we, JAMES A. WEBB, of Madison, in the county of Morris, and State of New Jersey, and CHRISTOPHER CORY, of Lima, in the county of La Grange, and State of Indiana, have invented a new and useful Improvement in the Application of Steam to Saccharine and other Evaporating-Pans; and we do hereby declare that the following is a full, clear, and exact description of the construction and operation of the same, reference being had to the annexed drawings, making part of the specification, in which—

To enable those skilled in the art to make and use our invention, we will proceed to describe its construction and operation.

Figure 1:
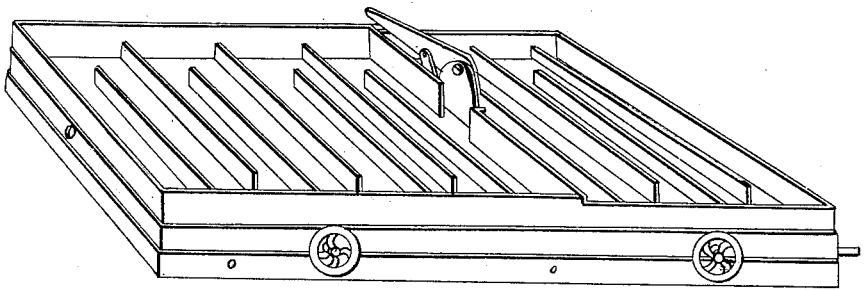
Figure 1 is a perspective view.
Figure 2:
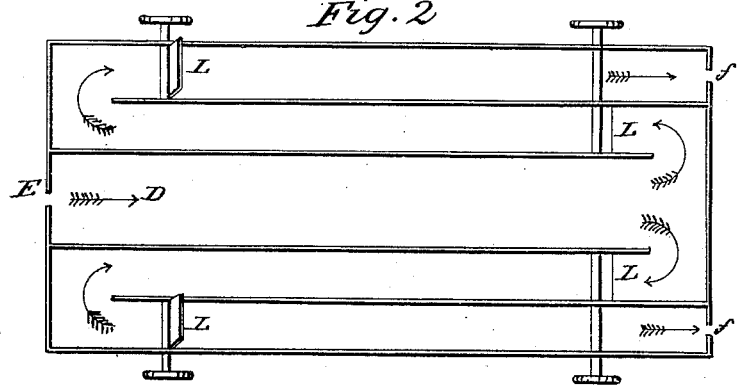
Figures 2 and 3 are inside views with the upper cover or combined evaporator removed.
Figure 3:
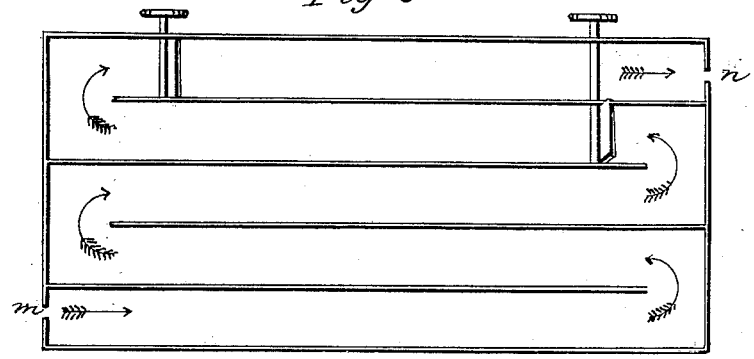

The evaporator may be made in any of the known forms in common use, preference, however, being given to the particular form and arrangement patented by the aforesaid C. CORY, September 10, 1861. Said evaporator is elongated in form, having transverse ledges so arranged as to prevent the direct flow of the liquid towards the finishing end of the pan. It is also, with one or more elevated partitions and gates, so adjusted as to regulate at pleasure the flow of liquids and to give increased facilities to its clarifying and condensing properties. To secure the best practical workings of this or other evaporating-pans, by steam or its equivalent, instead of the steam coil within, or the ordinary fixtures or fire-furnace immediately under the pan, attachments are added to its bottom surface, of wood, iron, copper, or other material, by which channels are formed for the admission and passage of said steam to the several portions of the bottom surface of the pan in the quality, quantity, and order designed, being regulated in its application and passage by stop-cocks and valves, or their equivalents. In those pans where the greater heat and ebullition are required at the longitudinal centre, or in front of the regulating partitions and gates, and comparatively less heat and action at the sides or commencing end, a process much needed for the successful manufacture of the juices of fruit and of saccharine fluids, the under channel D, fig. 2, of suitable width and depth, is placed in or near the longitudinal centre of said pan, and firmly attached to its under surface in such a manner that said under surface of the pan forms a tight covering for the said channel. This channel may be protected to a greater or less extent by a non-conductor of heat, and have its commencement at E in one end of the pan, and be extended forward in the direction of or to its opposite end, and thence duplicated and returned on each side of the channel first formed, and parallel to it, as marked by arrow heads, same figure. These having reached their appropriate termini, at or near their commencing end, are returned back still nearer to the extreme sides of the said pan, and disposed of at their respective outlets $ff$. The valves L L, or their equivalents, which may be varied in their form, number, or position, aid in regulating the application and passage of said steam or heat within said channels at the option of the operator. Under this arrangement of giving comparatively greater heat and ebullition to the central parts of the pan, the scum and other impurities are thrown most naturally to its less agitated sides and end, and thence floated off or otherwise removed. Our invention contemplates also the leaving out or changing at option the position and arrangement of said channels and valves so as to equalize the application and action of the heat as in steam chambers, or so as to produce the greater amount of heat and ebullition at any desired portion of the evaporator. Fig. 3 represents the securing the greater amount of heat and ebullition at one side of the evaporator by the application and use of the more heated channel $m$ placed under that particular part of it, while the less heated channel $n$ is at or near its other side; these being in other respects arranged and regulated as in fig. 2. To carry out and accomplish the same objects with still greater economy and perfection, the said under channels may be covered with or embedded wholly or in part in substances of non-conductors of heat, as seen at $o\ o$, fig. 1, by which means the heat is better economized or longer retained at given points, subject to variations as above.

In presenting this application for Letters Patent we do not claim the invention of applying steam generally to evaporating pans, as by coils within, or other old and well-known devices; but we claim—

1. The application of steam or its equivalent to evaporating-pans by means of under channels, with or without valves, so arranged as to produce the greater amount of heat and ebullition either at the centre, or at one side of the pan, or at certain given portions thereof as desired, while other portions of it shall be less heated and agitated, as herein set forth.

2. We claim the applying of steam beneath open pans so that their interior shall be left unobstructed for the work of the operator.

3. The combination with evaporating-pan of a steam channel or chamber, substantially as above set forth.

4. The application of non-conductors of heat to the under steam channels or chambers of evaporating-pans, substantially as set forth and described.

JAMES A. WEBB,
CHRISTOPHER CORY.

Witnesses:
    JEREMIAH BAKER,
    FERDINAND BAKER.